Sept. 17, 1929.   C. A. JOHNSON   1,728,566
RUNNER FOR AUTOMOBILES
Filed Feb. 28, 1928   2 Sheets-Sheet 1
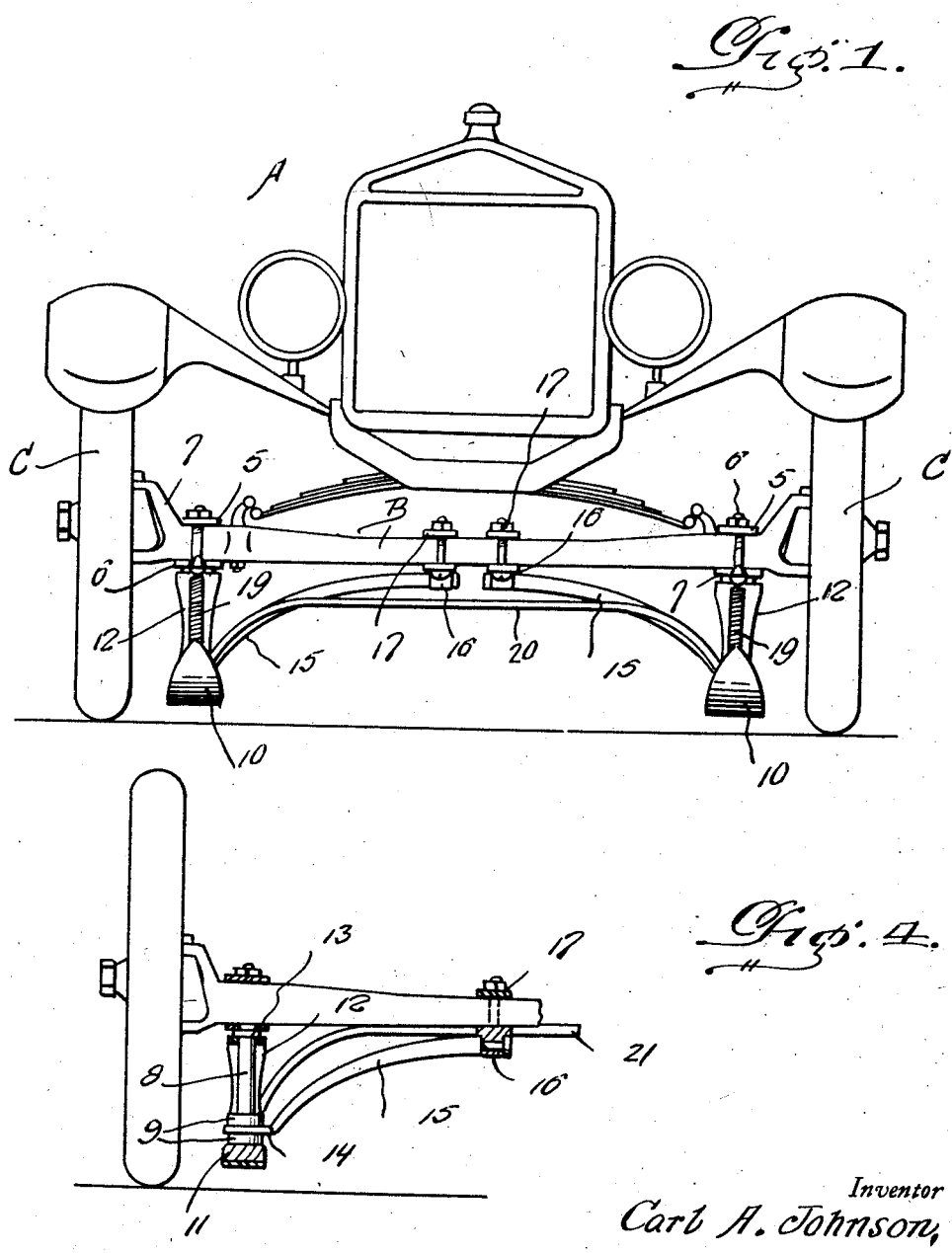

Sept. 17, 1929.  C. A. JOHNSON  1,728,566
RUNNER FOR AUTOMOBILES
Filed Feb. 28, 1928  2 Sheets-Sheet 2
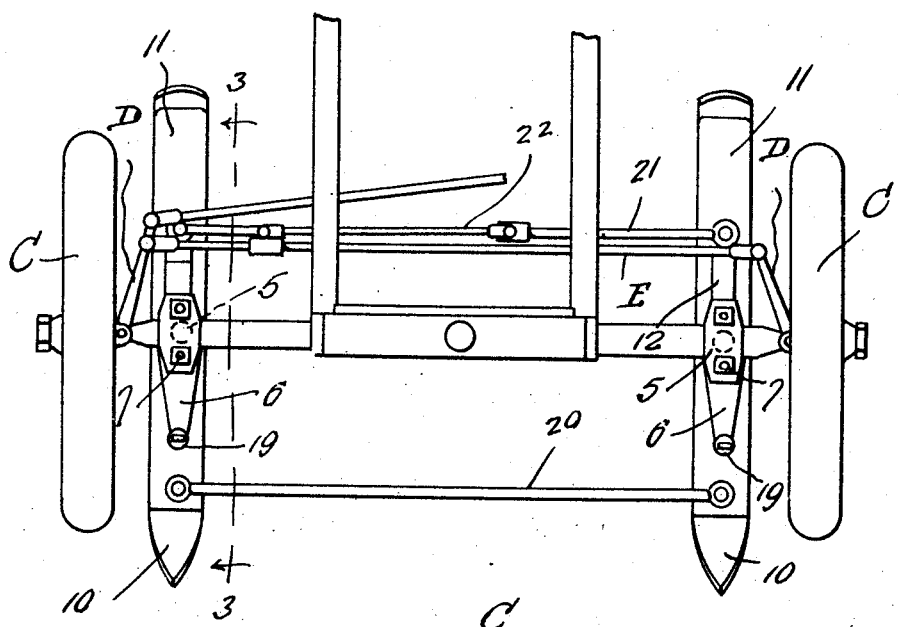
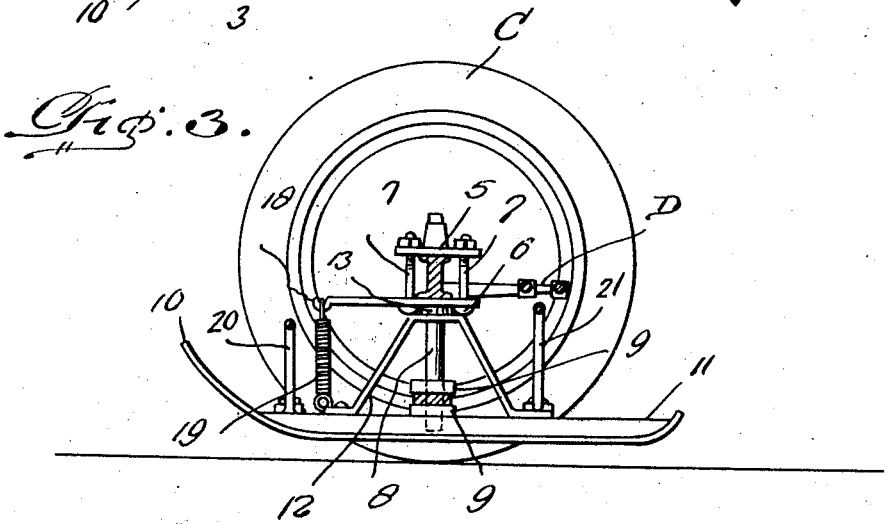
Inventor
Carl A. Johnson,
By Clarence A. O'Brien
Attorney Patented Sept. 17, 1929

1,728,566

UNITED STATES PATENT OFFICE

CARL A. JOHNSON, OF EAST GRAND FORKS, MINNESOTA

RUNNER FOR AUTOMOBILES

Application filed February 28, 1928. Serial No. 257,715.

This invention relates to new and useful improvements in sleigh runners and has for its primary object to provide a highly novel and inexpensive sleigh runner construction for the front end of an automobile, the said construction including a pair of runners disposed beneath the front axle at the inner sides of the steering wheel, and normally spaced slightly above the traction surface of the wheel tires so as to support the forward end of the automobile in heavy snow.

A further and most important object resides in the provision of a runner construction of this character that may be applied to practically all types of automobiles in a simple and inexpensive manner, and without requiring the alteration of the automobile construction to any extent whatever.

A still further object resides in the provision of such a device wherein the pair of runners are operatively interconnected, and that are furthermore operatively associated with the steering mechanism of the automobile so as to turn simultaneously with the turning of the forward wheel so as to facilitate the proper steering of the car when the forward end of the same is supported by the runners.

With the foregoing and other objects in view as the nature of the invention will be better understood, the same comprises the novel form, combination and arrangement of parts hereinafter more fully described, shown in the accompanying drawing and claimed.

In the accompanying drawings forming part of this application and in which like numerals indicate corresponding parts:

Figure 1 is a front elevation of a well known type of automobile equipped with my improved sleigh runner construction.

Figure 2 is a fragmentary top plan of the forward end of the automobile disclosing my runner construction.

Figure 3 is a longitudinal section taken substantially upon the line 3—3 of Figure 2 and looking in the direction of the arrows for disclosing one of the runner units and its associated parts in side elevation, and Figure 4 is a fragmentary section taken through one of the runner units and its directly associated structural units.

Now having particular reference to the drawings, A designates generally a conventional design of automobiles including the usual forward axle B to the ends of which are pivotally and rotatably mounted the usual front wheels C—C. The spindle arms D—D of these wheel supports are joined by the usual connecting rod E of the steering mechanism. Each runner unit is of identical construction and a description of one will suffice for both.

As more clearly disclosed in Figure 3, each runner unit consists of a pair of clamp plates 5 and 6 for disposition respectively at the top and bottom surfaces of the automobile axle directly inwardly of the forked end thereof and interconnected by bolts 7—7. Formed integrally with the lower plate 6 intermediate these bolts 7—7 is a depending post 8 formed adjacent its lower end with a pair of spaced flanges 9—9. Each unit further consists of a suitable metallic runner 10 having upon its inner face a wooden filler block 11 within the center of which is the lower end of the post 8 is mounted so that the runner may turn thereon. Furthermore projecting vertically from the filler 11 is an inverted U-shaped metallic supporting bracket 12 secured at its lower ends rigidly to the filler and having at its upper end an opening therein through which the post 8 extends as more clearly disclosed in the sectional view of Figure 4. Directly above this bracket 12 said post 8 is formed with a flange 13 to prevent the supporting bracket 12 from engaging the clamp bolts 7—7 or the lower clamp plate 6.

Arranged over the post 8 between the flange 9—9 of the lower end thereof is the inner plate end 14 of an upwardly curved inwardly extending tie rod 15 that is rigidly secured at its opposite end within a collar 16 formed integrally with the lower member of a two-part clamp 17 rigidly secured to the automobile axle B, the pair of clamps being in slight spaced relation and as in Figure 1.

The lower clamp plate 6 extends forwardly beyond the adjacent end of the upper clamp plate 5 and is formed with a hook 18 secured to which is one end of a retractile coil spring 19, the lower end thereof being rigidly secured to the filler block 11 of said runner 10. This spring is for the purpose of normally maintaining the runner in relatively true parallel relation with the horizontal axis of the automobile as in Figure 2, and also reducing vibration of the runner.

The forward ends of the pair of runners 10—10 are interconnected by a cross rod 20, the ends thereof being bolted to the forward ends of the respective filler blocks 11, while this connecting rod is raised considerably above the runner surfaces so as to prevent the striking of the same against rocks, stones, or other small elements that may be encountered by an automobile.

The runners 10—10 are further interconnected at a point directly in back of the connecting rod E of the automobile steering mechanism by a connecting rod 21 pivoted at its ends to the runners and intermediate its ends having parallel relation with the vehicle steering mechanism connecting rod E, and at a point slightly therebeneath as in Figure 3. This connecting rod 21 is operatively associated with the connecting rod E—E of the vehicle steering mechanism by a conventional tie rod 22, secured at its ends to the said rods E and 21 in the usual manner so that when the steering mechanism connecting rod is operated for controlling the movement of the vehicle wheels C—C, the rod 21 of my improved device will be operated in similar directions for causing the turning of the runners 10—10 upon the posts 8—8.

It will thus be seen that I have provided a highly novel simple and efficient sleigh runner attachment for automobiles that may be easily applied to or removed from the car without requiring the services of a skilled mechanic, and without altering the construction of the automobile and without interfering with the steering of the car.

Even though I have herein shown and described the invention as consisting of certain detail structural elements it is nevertheless to be understood that some changes may be made therein without affecting the spirit and scope of the appended claim.

Having thus described the invention, what I claim is:

In a vehicle sleigh runner unit for the front axles of automobiles, clamps secured to the vehicle front axle inwardly of the steering wheels thereof, each of said clamps consisting of a pair of plates arranged upon the upper and lower faces of the axle, bolts interconnecting said plates, a post depending from the lower plate, a sleigh runner mounted for rotation upon the lower end of the post, a contractile coil spring connection between the runner and the lower clamp plate for maintaining the runner normally centered, a rod interconnecting the pair of runners, a brace between each runner and the automobile axle, and an operative connection between the vehicle steering mechanism and the rod to cause the turning of the runners upon their posts simultaneously with the turning of the vehicle steering wheel.

In testimony whereof I affix my signature.

CARL A. JOHNSON.